United States Patent
Snyder et al.

(10) Patent No.: US 9,587,561 B2
(45) Date of Patent: Mar. 7, 2017

(54) HEAT EXCHANGER INTEGRATED WITH A GAS TURBINE ENGINE AND ADAPTIVE FLOW CONTROL

(71) Applicant: Rolls-Royce North American Technologies, Inc., Indianapolis, IN (US)

(72) Inventors: Douglas J. Snyder, Carmel, IN (US); Kenneth M. Pesyna, Carmel, IN (US); Anthony F. Pierluissi, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 561 days.

(21) Appl. No.: 14/107,412

(22) Filed: Dec. 16, 2013

(65) Prior Publication Data
US 2014/0271116 A1    Sep. 18, 2014

Related U.S. Application Data

(60) Provisional application No. 61/792,149, filed on Mar. 15, 2013.

(51) Int. Cl.
| | |
|---|---|
| F01D 25/12 | (2006.01) |
| F02C 7/12 | (2006.01) |
| F02C 7/141 | (2006.01) |
| F02K 3/06 | (2006.01) |
| F02C 7/14 | (2006.01) |
| F02C 7/18 | (2006.01) |

(52) U.S. Cl.
CPC ............... *F02C 7/12* (2013.01); *F01D 25/12* (2013.01); *F02C 7/14* (2013.01); *F02C 7/141* (2013.01); *F02C 7/18* (2013.01); *F02K 3/06* (2013.01); *F05D 2260/20* (2013.01); *Y02T 50/675* (2013.01)

(58) Field of Classification Search
CPC ...... F02C 7/141; F01D 25/12; F05D 2260/20; F05D 2260/213; Y02T 50/675
See application file for complete search history.

(56) References Cited

U.S. PATENT DOCUMENTS

| | | |
|---|---|---|
| 3,528,250 A | 9/1970 | Johnson |
| 5,269,133 A | 12/1993 | Wallace |
| 5,269,135 A | 12/1993 | Vermejan et al. |

(Continued)

FOREIGN PATENT DOCUMENTS

| | | |
|---|---|---|
| EP | 1882824 A2 | 1/2008 |
| EP | 2011988 A2 | 1/2009 |

OTHER PUBLICATIONS

International Search Report for PCT/US2013/075503 mailed May 8, 2014.

*Primary Examiner* — Ninh H Nguyen
(74) *Attorney, Agent, or Firm* — Fishman Stewart PLLC

(57) ABSTRACT

One embodiment of an engine may include an enclosure surrounding an engine having an engine centerline, and the enclosure defining a passage for a cold-side airflow. The engine may also include one or more contiguous heat exchangers having a cold side inlet surface receiving a cold-side airflow. The heat exchanger may be disposed within the passage, such that a surface normal relative to the cold side inlet surface is offset by at least 30 degrees from the engine centerline.

20 Claims, 11 Drawing Sheets

(56) References Cited

U.S. PATENT DOCUMENTS

| | | | |
|---|---|---|---|
| 5,806,793 A * | 9/1998 | Brossier | B64D 33/08 244/117 A |
| 6,106,229 A | 8/2000 | Nikkanen et al. | |
| 6,134,880 A | 10/2000 | Yoshinaka | |
| 6,422,807 B1 | 7/2002 | Leach et al. | |
| 6,584,778 B1 | 7/2003 | Griffiths et al. | |
| 7,251,942 B2 | 8/2007 | Dittmar et al. | |
| 7,334,411 B2 | 2/2008 | Vandermolen | |
| 7,946,806 B2 | 5/2011 | Murphy | |
| 8,266,888 B2 | 9/2012 | Liu | |
| 8,910,465 B2 * | 12/2014 | Snyder | F01D 25/12 60/266 |
| 8,961,114 B2 * | 2/2015 | Ruthemeyer | F01D 5/146 415/145 |
| 2004/0069472 A1 | 4/2004 | Shimoya | |
| 2009/0188232 A1 * | 7/2009 | Suciu | B64D 27/18 60/39.83 |
| 2010/0074736 A1 * | 3/2010 | Junod | F02C 3/32 415/178 |
| 2010/0230081 A1 | 9/2010 | Becnel et al. | |
| 2012/0144842 A1 | 6/2012 | Snyder | |
| 2012/0168115 A1 | 7/2012 | Raimarckers et al. | |
| 2013/0247587 A1 * | 9/2013 | Lo | F02C 6/08 60/806 |

* cited by examiner

HEAT EXCHANGER INTEGRATED WITH A GAS TURBINE ENGINE AND ADAPTIVE FLOW CONTROL

CROSS-REFERENCE TO RELATED APPLICATIONS

This application claims priority to U.S. Provisional Patent Application No. 61/792,149 filed Mar. 15, 2013, the contents of which are hereby incorporated in their entirety.

FIELD OF TECHNOLOGY

The disclosure relates generally to heat transfer systems utilizing heat exchangers in a gas turbine engine, and particularly to an engine having a fan bypass duct and heat exchangers arranged within the duct to reject a heat load while decreasing engine stream pressure drop losses relative to other means of implementation and to enable adaptive control of the cooling capability of the heat exchangers.

BACKGROUND

Aircraft and engine manufacturers may be developing heating and cooling systems, which include heat exchangers installed within gas turbine engines for rejecting heat loads of the gas turbine or another system utilizing the gas turbine engine. For example, an aircraft may have a refrigeration system including heat exchangers installed within a fan bypass duct of a gas turbine engine, such that the airstream may pass through the heat exchangers in an axial direction of the engine. The heat exchangers create a blockage in the fan bypass duct and produce a pressure difference, thereby drawing air through the heat exchangers in the axial direction.

The typical system may include heat exchangers distributed substantially around the entire circumference of the fan bypass duct, which may therefore create blockage in the engine air stream resulting in a pressure drop and a subsequent decrease in engine thrust. To compensate for the decreased engine thrust, the system may increase the supply of fuel to the turbine. Furthermore, at somewhat low airflow rates, the blockage may not create a sufficient pressure difference across the heat exchangers thereby drawing less air through the heat exchangers and decreasing the cooling rate of the system. Conversely, at somewhat high airflow rates, the blockage may create somewhat large pressure drops or even possibly choke the engine stream flow.

Therefore, a need exists for an improved engine and process for efficiently rejecting heat from the heat exchangers within the engine while decreasing pressure losses.

DETAILED DESCRIPTION

Gas turbine engines may have a duct and heat exchangers arranged circumferentially around a substantial portion of the duct, even though a substantial remaining axial length of the duct may be unoccupied by the heat exchangers. This configuration may create blockage in the airstream passing through the duct and result in somewhat significant pressure losses.

An improved engine may include a series of heat exchangers arranged within an engine stream to increase the cooling capability of the heat exchangers and reduce pressure losses in the engine air stream. In particular, the engine may have the heat exchangers arranged therein to increase the cold side frontal area of each heat exchanger. For example, the arrangement of the heat exchangers may reduce the blockage by one-third while increasing the cold-side frontal area by a factor of three. However, the arrangement of heat exchangers may reduce the blockage by more or less than one-third and increase the cold-side frontal area by other suitable factors.

Figure 1:
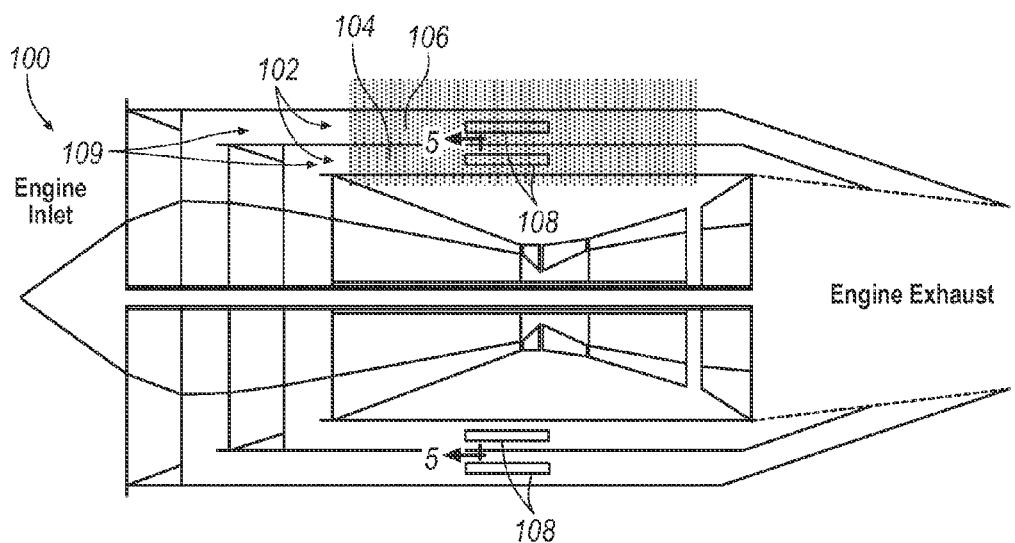
FIG. 1 illustrates a schematic cross-sectional view of an engine having a fan bypass duct and a third stream duct, with heat exchangers arranged in one of the ducts to increase the cold side frontal area of each heat exchanger along an axial length of the engine and induce a pressure field with a reduced amount of airstream blockage.

Referring to FIG. 1, one embodiment of a gas turbine engine 100 may include a passage 102, such as a fan bypass duct 104 or a third stream duct 106, with either duct having one or more heat exchangers 108 arranged therein for receiving a cold-side airflow 109 and enhance the cooling capability of the heat exchangers. The heat exchangers may be a device that transfers heat from one fluid stream to another fluid stream.

Figure 2:
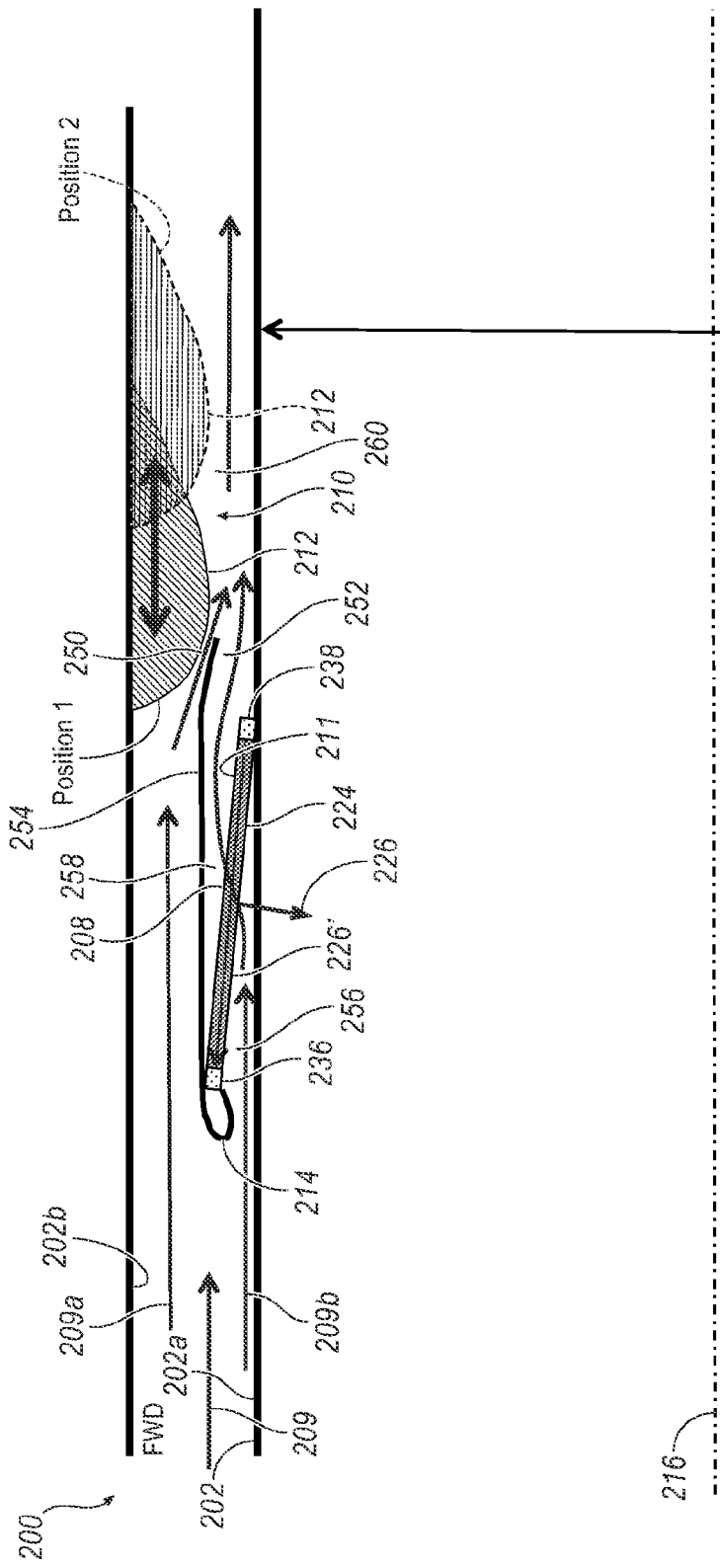
FIG. 2 illustrates an enlarged cross-sectional view of one embodiment of the engine of FIG. 1, with the engine having variable geometry and one or more heat exchanger segments extending circumferentially around the engine along with a forward-facing scoop to separate the cooling stream from the rest of the engine stream.

Referring now to FIG. 2, one embodiment of an engine 200 may be substantially similar to the engine 100 of FIG. 1, with one or more heat exchangers or heat exchanger segments 208 may extending circumferentially about an engine centerline or rotation axis 216 (hereinafter "engine centerline") and within the passage 202. For instance, the heat exchanger may extend a full 360 degrees about the engine. However, the engine may instead have one or more heat exchangers that angularly extend less than 360 degrees. The heat exchangers may be arranged in the fan bypass duct or the third stream duct. However, the heat exchangers may instead be arranged in a ram air duct or other engine stream duct. Each heat exchanger may be disposed within the passage such that a surface normal 226 relative to a center portion 226' of a cold side inlet surface 224 of the heat exchanger is offset from an engine center line 216 by at least 30 degrees. The center portion 226' may be any portion of the cold side inlet surface 224 spaced apart from an edge or corner of the cold side inlet surface 224. For example, the surface normal may be relative to a center portion of any one of four quadrants of the surface, or the center of any sector of any sized array, such as a 10×10 array with one hundred sectors each having a center portion.

The engine may receive a cold-side airflow 209 from region 256 that may pass through the heat exchangers 208 in a radial and aft direction with respect to the engine centerline 216 to region 258. This arrangement may increase the available cold-side frontal area by over an order of magnitude depending on, for example, the axial length of the heat exchanger along the duct and the degree by which the heat exchanger extends around the circumference of the engine. A pressure difference is created across the cold side of the heat exchanger through the use of a converging/diverging section.

The engine may also include variable geometry for each heat exchanger 208, to vary the amount of cold flow going through the heat exchangers 208, to allow for flow variation in the engine stream or to provide a combination thereof. In this example, the variable geometry may be a variable flow control mechanism 210 and an actuator (not shown) that moves the variable flow control mechanism for adjusting a throat area within the passage. The variable flow control mechanism, in this form, may be a ring 212 extending around the entire circumference of the engine. The ring 212 may be slidably coupled to an outer diameter 202b of the passage and continuously movable between forward and aft positions for modifying pressures in the passage so as to direct the cold-side airflow through the heat exchangers at a plurality of rates. However, the ring may instead be slidably carried by an inner diameter 202a of the passage. In position 1, the ring may create a reduced throat area 250, which reduces the static pressure at the heat exchanger exit 252. Of course, however, this engine may not have the ring or other variable flow control mechanisms associated with the heat exchanger.

The engine may further include a divider 254 that separates the airflow 209 into a first stream 209a that bypasses the heat exchanger and a second stream 209b that passes through the heat exchanger so that the pressure on a downstream side 211 of the heat exchanger is reduced by the action in region 252 and 254. This induced pressure gradient draws or increases the flow rate of the second stream 209b through the heat exchanger, relative to the condition when the ring is in position 2. The two streams of air mix and are then passed into the diffusing section 260 to reduce stream velocity and thereby recover dynamic pressure. The variable flow control mechanism may instead be one or more ring segments extending less than the full circumference of the engine or be other variable geometry that recovers pressure as the flow is diffused, so as to maximize the thrust produced by the engine stream while meeting heat rejection requirements.

The engine 200 may also include a forward-facing scoop 214 to capture the flow in order to recover the dynamic pressure so that a higher pressure is used to feed the cold-side airflow through the heat exchanger(s). To that end, the heat exchanger 208 may have a forward portion 236 coupled to the forward facing scoop and an aft portion 238 coupled to an inner diameter 202a of the duct, such that the cold-side airflow is drawn through the cold side inlet surface of the heat exchanger along a vector having a radial component relative to the engine centerline. However, the aft portion may be coupled to an outer diameter 202b of the duct instead of the inner diameter.

Figure 3:
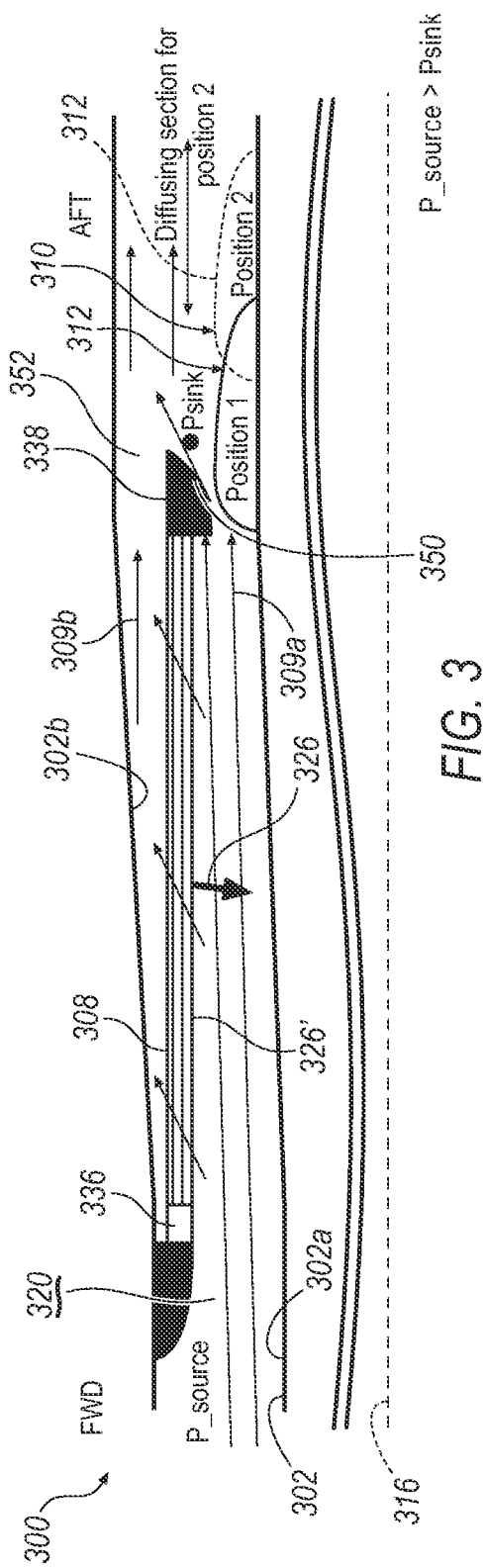
FIG. 3 illustrates an enlarged cross-sectional view of another embodiment of the engine of FIG. 1, with the engine having at least one heat exchanger segment extending circumferentially around the engine.

Turning now to FIG. 3, another embodiment of an engine 300 is substantially similar to the engine 200 of FIG. 2 and includes similar elements as designated by corresponding reference numerals in the 300 series. However, the engine 300 may not include the forward facing scoop. In addition, the engine 300 may have a heat exchanger 308 with a forward portion 336 coupled to an outer diameter 302b of the passage and an aft portion 338 extending radially inward and axially downstream but spaced apart from an inner diameter 302a of the passage. Furthermore, the engine may include variable geometry or ring 312 that may be slidably carried by an inner diameter 302a of the duct and movable between forward and aft positions. However, the ring may instead be slidably carried by an outer diameter 302b of the passage rather than the inner diameter. In addition, this engine may not have the ring or other variable flow control mechanisms associated with the heat exchanger.

Figure 4:
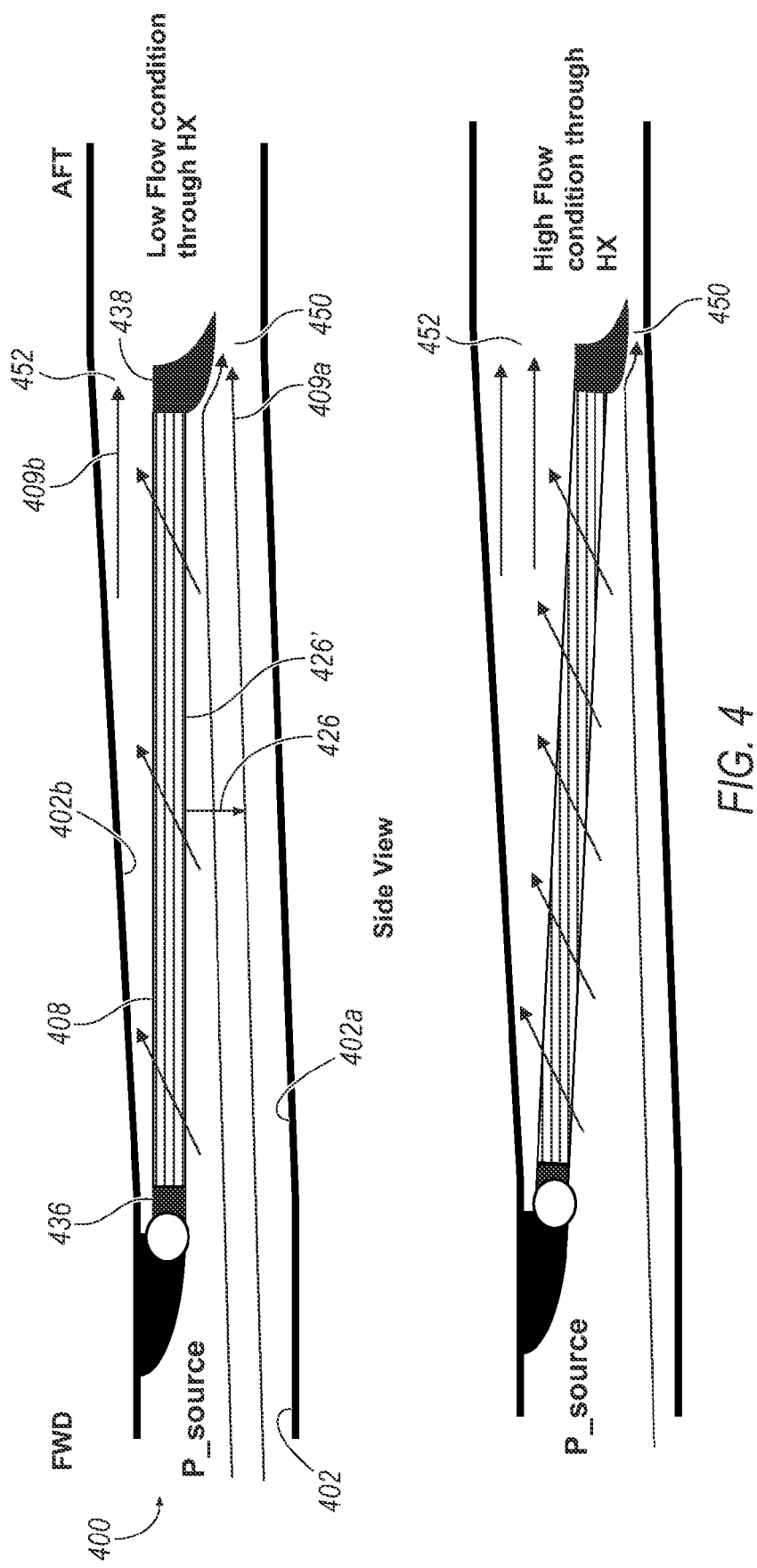
FIG. 4 illustrates an enlarged cross-sectional view of yet another embodiment of the engine of FIG. 1, with the engine having variable geometry and one or more heat exchanger segments extending circumferentially around the engine and pivotally attached to the engine for controlling the flow rate through the heat exchanger.

Referring now to FIG. 4, another embodiment of an engine 400 may be substantially similar to the engine 300 shown in FIG. 3 and includes similar elements as designated by corresponding reference numerals in the 400 series. However, the heat exchanger 408 may have a forward portion 436 that is pivotally attached to the outer diameter of the passage, such that the aft portion 438 of the heat exchanger may be spaced a greater distance apart from the inner diameter 402a of the passage to decrease cold-side airflow through the heat exchanger. Conversely, the aft portion 438 may be moved closer to the inner diameter 402a of the passage to increase cold-side airflow through the heat exchanger 408. As drawn, FIG. 4 only has a converging section and does not have a diffusing section for recovering pressure.

Figure 5:
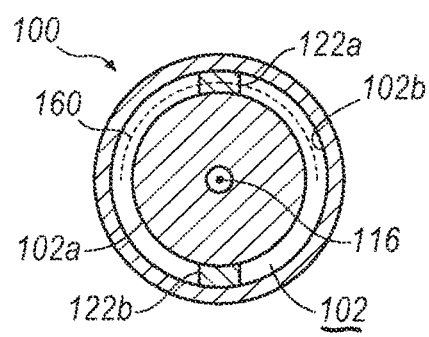
FIG. 5 is a schematic cross-sectional view of the engine shown in FIG. 1, as taken line 5-5 of FIG. 1.

Referring now to FIGS. 1 and 5, another embodiment of the engine 100 may have non-variable geometry including modules of heat exchangers. In particular, the passage 102 may extend 360 degrees circumferentially about the engine centerline and axially along the length of the engine. The engine 100 may further include a series of the modules 122 spaced uniformly apart along the circumference of the passage. For example, the engine may include a first module 122a and a second module 122b disposed diametrically opposite to the first module about the engine centerline, without any additional modules in the duct so as to minimize blockage and pressure loss in the duct and minimize fuel consumption. However, more or less than two modules may be disposed uniformly or non-uniformly along the circumference of the passage.

Figure 6:
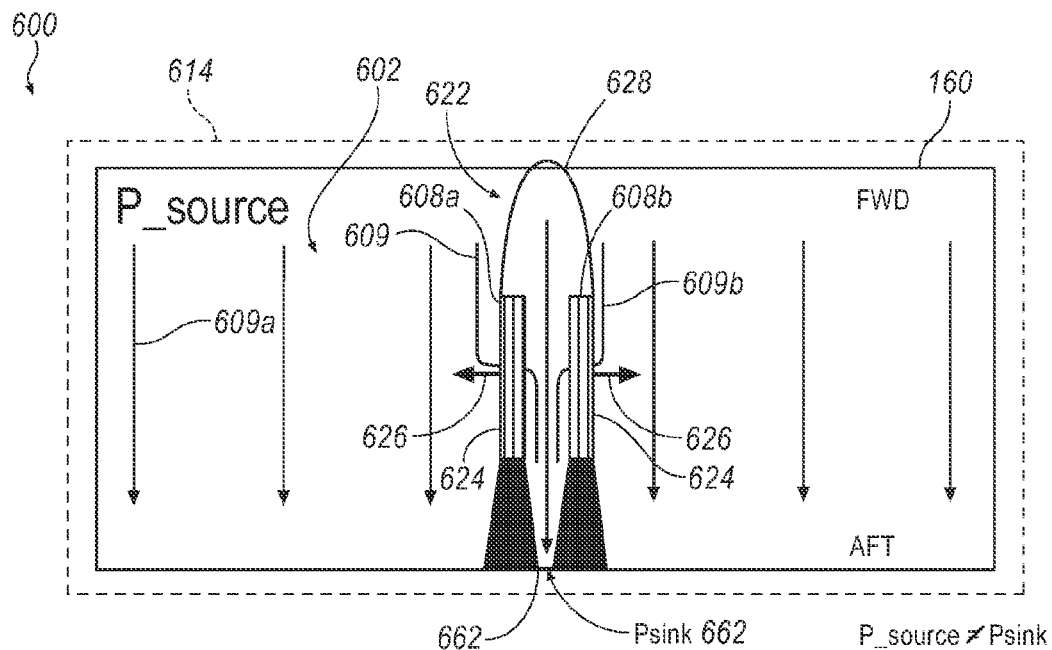
FIGS. 6-9 are cross-sectional views of multiple embodiments of a module for the engine of FIG. 5, as taken along A-A of FIG. 5.

Referring to FIG. 6, one embodiment of a module 622 for the engine 100 of FIG. 5 may have one or more contiguous heat exchangers 608a, 608b, which each have a cold side inlet surface 624 receiving the cold-side airflow 609. The heat exchangers may be shell-and-tube heat exchangers spaced apart from one another. However, the heat exchangers may instead be plate-fin heat exchangers or other suitable heat exchangers. Each heat exchanger may be disposed within the passage 602 such that a surface normal 626 relative to a center of the cold side inlet surface 624 is offset by at least 30 degrees from the engine centerline. For example, the heat exchangers may be parallel to one another and further parallel to the engine centerline, such that the surface normal 626 of the cold side inlet surface 624 is offset from the engine centerline by 90 degrees. However, the surface normal may be offset from the engine centerline by any suitable angle greater than 30 degrees. In addition, non-center or peripheral portions of the heat exchanger may have surface normals that are offset from the engine centerline by more than 30 degrees. Furthermore, each module may include a nose cone 628 for directing the cold-side airflow circumferentially about the engine and uniformly through the contiguous heat exchangers 608a, 608b. In FIGS. 6-9, the pressure difference across the heat exchangers is created by a pressure sink 662 (or the equivalent) where P_source is greater than P_sink.

Figure 7:
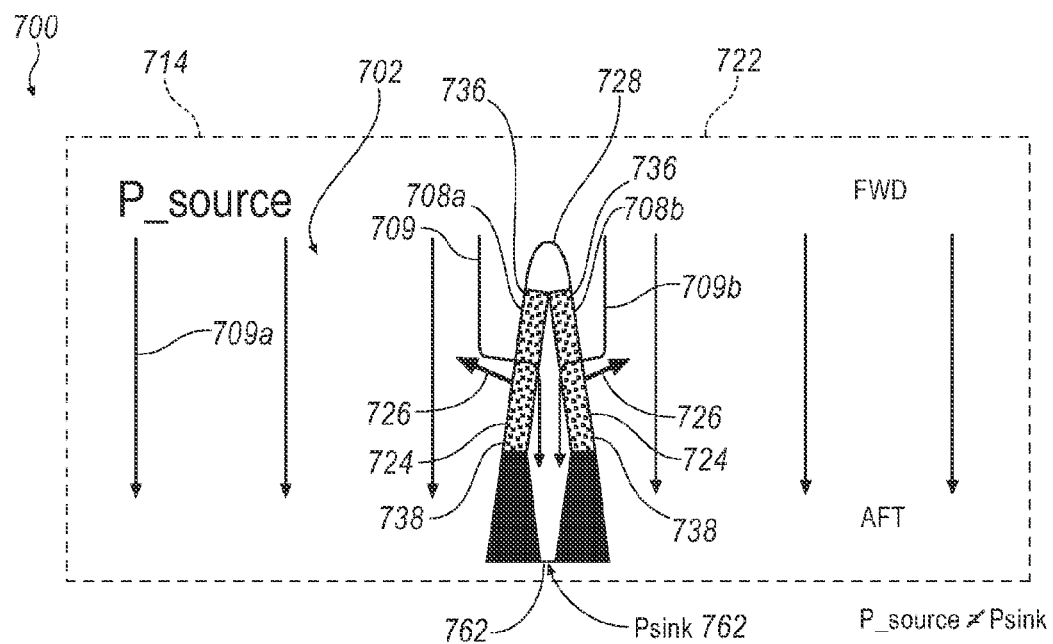

Referring now to FIG. 7, another embodiment of a module 722 for the engine of FIG. 5 may be substantially similar to the module 622 of FIG. 6, with corresponding features identified by reference numerals in the 700 series. However, the module 722 may have a pair of contiguous heat exchangers 708a, 708b that may not be parallel to one another but rather tapered, such that each one has an upstream end 736 spaced apart from the other by a first distance and a downstream end 738 spaced apart from the other by a second distance that is greater than the first distance. For example, the first distance may be zero such that the upstream ends are adjacent to one another. However, the first distance may be greater than zero such that the upstream ends are spaced apart from each other.

Figure 8:
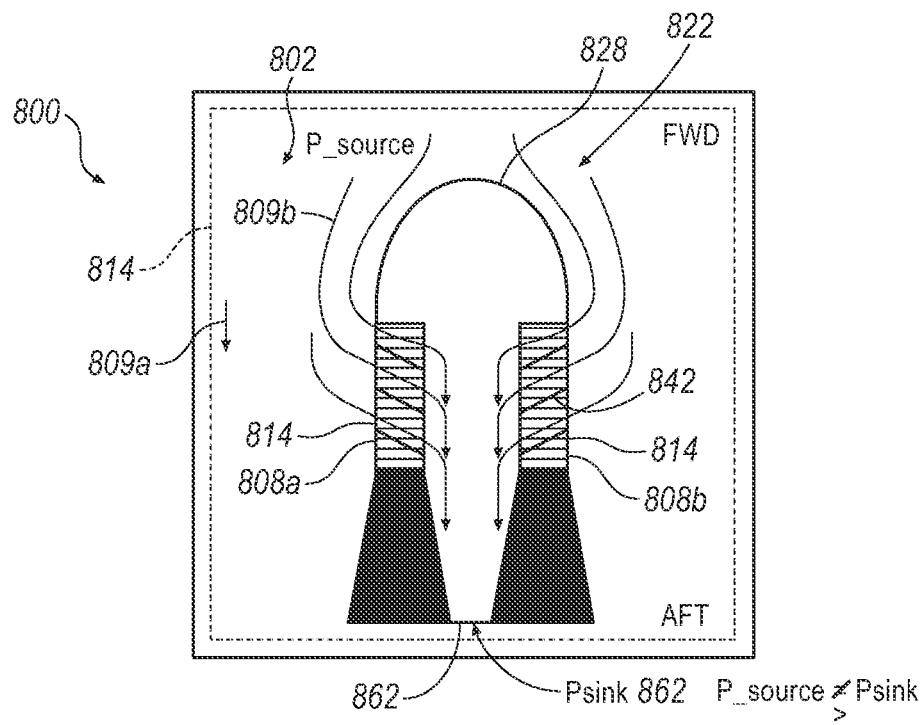

Turning now to FIG. 8, yet another embodiment of a module 822 for the engine of FIG. 5 may be substantially similar to the module 622 of FIG. 6, with corresponding features identified by reference numerals in the 800 series. However, the module 822 may include heat exchangers 808a, 808b, which may be shell-and-tube heat exchangers including a plurality of guide plates 842 to direct the cold-side airflow 809b through the shell-and-tube heat exchanger and distribute the cold-side airflow through the exit side of the heat exchangers. Still another embodiment of a module for the engine of FIG. 5 may be substantially similar to the module 622 of FIG. 6. However, the module may include heat exchangers, which may be plate-fin heat exchangers including a plurality of guide fins to direct the cold-side airflow through the plate-fin heat exchangers and distribute the cold-side airflow through the exit side of the heat exchanger. Of course, the modules may include any suitable heat exchanger having guide plates, guide fins or a combination of the same.

Figure 9:
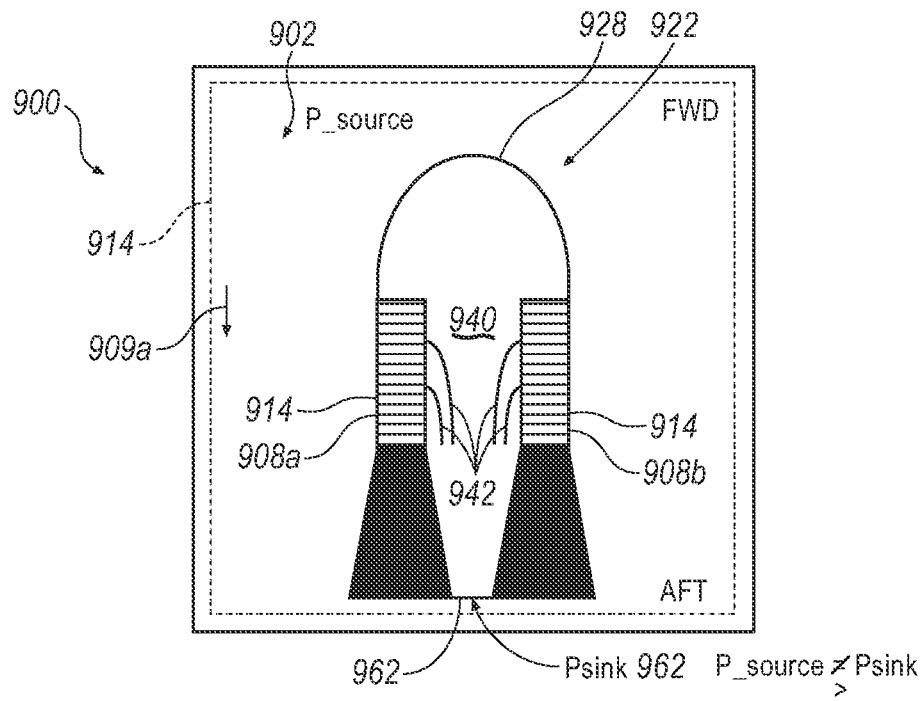

Referring now to FIG. 9, still another embodiment of a module 922 for the engine of FIG. 5 may be substantially similar to the module 622 of FIG. 6, and include corresponding features identified by reference numerals in the 900 series. However, the module 922 may have an internal passage 940 receiving the cold-side airflow from heat exchangers 908a, 908b, and a plurality of vanes 942 disposed within the internal passage 940 for providing a more uniform pressure on the backside of the heat exchangers. This will help to provide better flow distribution through the heat exchangers.

Figure 10:
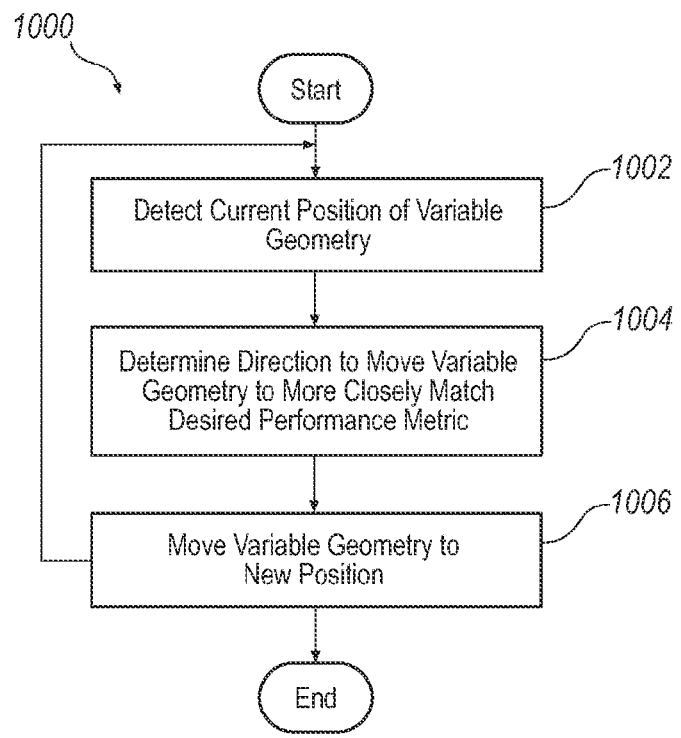
FIG. 10 illustrates a flowchart depicting one embodiment of a process for operating the engine of FIG. 1.

Referring now to FIG. 10, one embodiment 1000 of a process for operating the engine of FIG. 1 is illustrated. At block 1002, the engine and a control system (not shown) coupled to the engine may be started up. In particular, at startup, the control system may detect a current position of variable geometry of the engine. For example, the system may detect the position of the variable flow control mechanism or converging/diverging mechanism 210 (FIG. 2) relative to forward or aft portions of the engine. As another example, the system may detect the angular position of the pivoting heat exchanger 408 (FIG. 4).

At step 1004, the control system may detect a current performance of the heat exchanger and then determine a direction in which to move variable geometry of the engine based on the current performance of the heat exchanger. In particular, the control system may detect performance based on any one or more suitable predetermined performance metrics for an overall system having the heat exchanger installed therein. For example, one performance metric may be an exit temperature of the hot air leaving the heat exchangers. Another performance metric may be a pressure drop across the heat exchangers. Still another performance metric may be an overall fuel burn rate of the full vehicle/engine system. Based on the configuration of the variable geometry and the performance metrics, the control system may then determine the direction and distance to move variable geometry in order to improve the performance of the heat exchanger. This process may be accomplished through the use of onboard computer models or by perturbing the position of the variable geometry, so as to determine an effect on the performance metric and then determine a direction to move the variable geometry based on the effect.

At block 1006, the variable geometry may then be moved to the new position, and the process may return to block 1002. Of course, other suitable devices may be used on the platform in which this device is installed to further support the operation of this mechanism.

Figure 11:
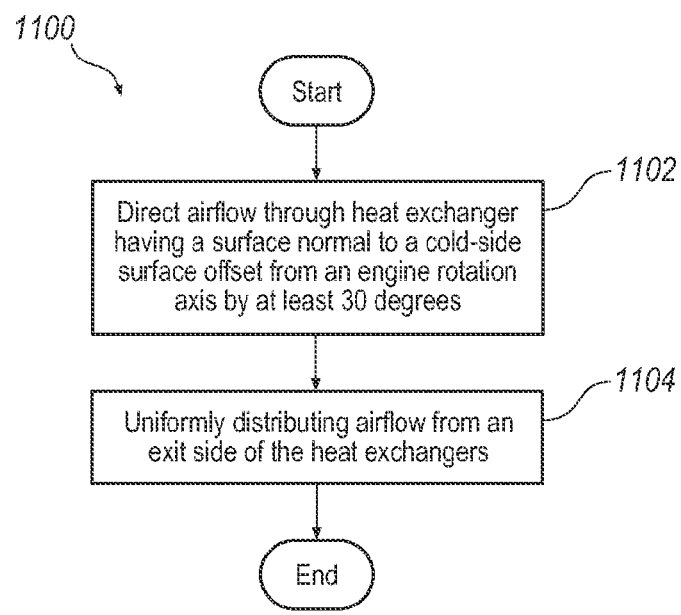
FIG. 11 illustrates a flowchart depicting another embodiment of a process for operating the engine of FIG. 1.

Referring to FIG. 11, another embodiment of a process 1100 for cooling a heat load within the engine 200 of FIG. 2 is illustrated. At block 1102, the cold-side airflow is directed in a passage of airflow 209 of the engine 200.

At block 1102, the cold-side airflow is directed via the airflow 209 of the cold side inlet surface of one or more contiguous heat exchangers disposed within the passage, such that a surface normal relative to the cold side inlet surface is offset by at least 30 degrees from the engine centerline. In this respect, the heat exchangers may extend along an axial length of the engine thereby increasing the cold-side frontal area of each heat exchanger to improve cooling capability and reduce the need for additional heat exchangers around the circumference of the duct that may block the airstream.

At block 1104, the cold-side airflow is uniformly distributed through the heat exchanger and from the exit or downstream side of the heat exchangers to reduce pressure losses by, for example, directing the cold-side airflow along a plurality of fins, a plurality of guide plates and a plurality of vanes arranged within the heat exchanger and downstream of the cold side exit surface of the heat exchanger or any combination thereof.

Figure 12:
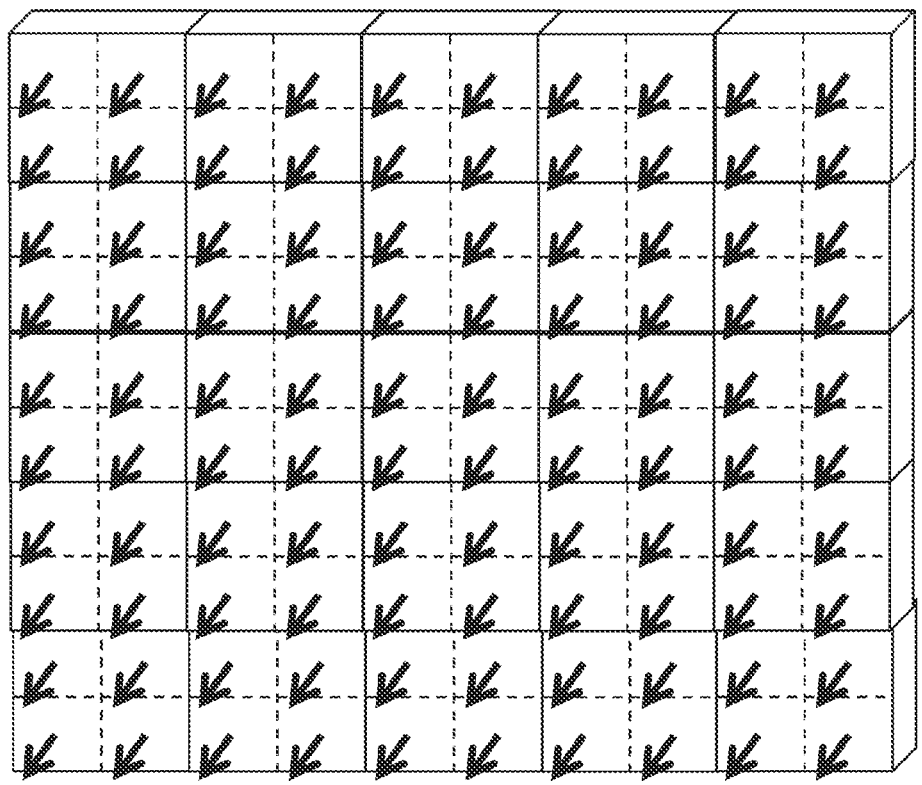
FIG. 12 illustrates a perspective view of one embodiment of a heat exchanger for the gas turbine engine of FIG. 1.

Referring to FIG. 12, another embodiment of a heat exchanger for a gas turbine engine is shown. In this example, the cold inlet surface of the heat exchanger may be divided into 100 patches. The surface normal at the center of each patch may be defined, such that there is an absolute value of the angle between each surface normal relative to the engine rotation axis. The surface normal of the heat exchanger's cold side inlet surface may then be determined as an average value of all of these angles. However, the surface normal may be defined by various other suitable ways. This surface normal may be offset from the engine rotation axis by at least 30 degrees.

Figure 13:
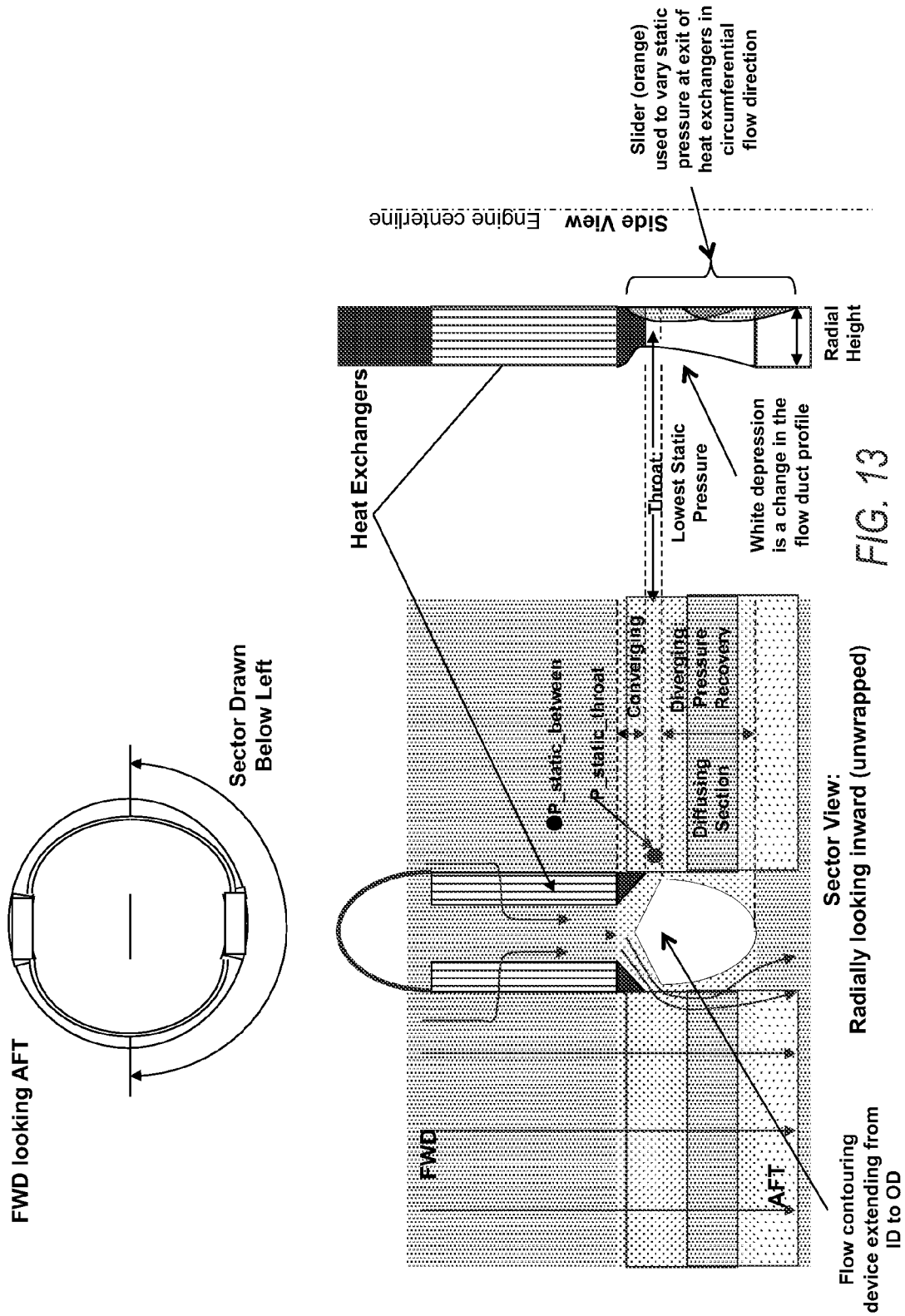
FIG. 13 illustrates a cross-sectional view of another embodiment of a module for the engine of FIG. 5, as taken along A-A of FIG. 5 and including variable geometry to control flow with a heat exchanger.

Referring to FIG. 13, another embodiment of the modules 122 of FIG. 5 for a gas turbine engine may have variable geometry to control flow through the heat exchanger modules. All features shown in FIG. 6-9 can be included with the design shown in FIG. 13. In this respect, the modules may have a reduction in flow area to reduce the static pressure at the exit of the heat exchangers as denoted by the throat area. In addition, the reduced flow area can be varied by implementing variable geometry through the use of a slider feature. As the slider feature is move forward, the throat area may be decreased. This may reduce static pressure and draw more cold air through the heat exchanger modules. In conditions where less cooling may be required, the slider may be moved aft to increase the throat area. The reduction in duct cross-sectional area and the slider device may be configured to enable pressure recovery of the fluid streams that have passed through the heat exchangers and that have bypassed the heat exchangers. The slider may be a full circumference device or be implemented in segments as shown in FIG. 13. The slider may be slidably carried by either the inner diameter or outer diameter of the duct. A shield device downstream of the heat exchangers may contour and guide the flow coming from the heat exchangers and may be intended to extend from the inner diameter to the outer diameter of the duct.

Figure 14:
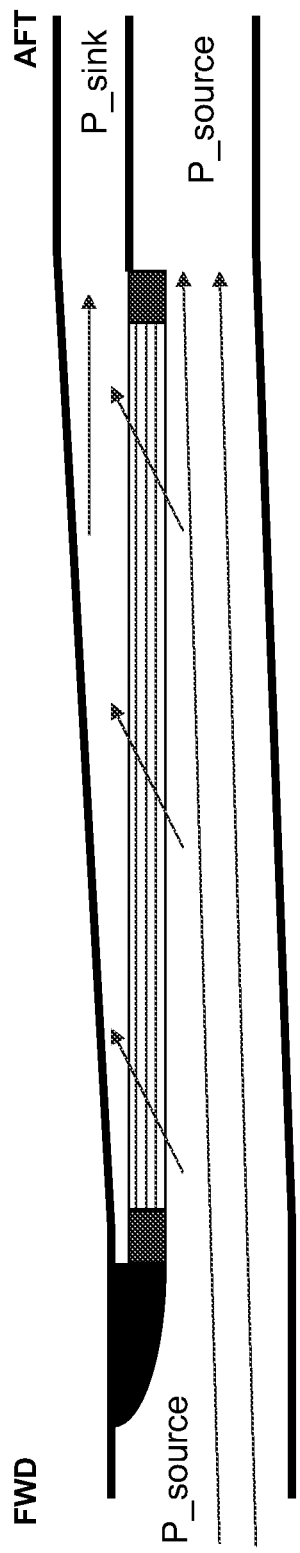
FIG. 14 illustrates a schematic cross-sectional view of another embodiment of a gas turbine engine having one or more heat exchanger segments extending circumferentially around the engine that does not use variable geometry to control flow.

Referring now to FIG. 14, another embodiment of the modules for a gas turbine exchange may have one or more heat exchanger segments extending circumferentially about the engine centerline or rotation axis. This engine does not use variable geometry to control the flow through the heat exchanger. Rather, the flow may be controlled similar to that shown in FIGS. 6-9 where a lower sink pressure is provided by the engine or vehicle system. The downstream side of the heat exchanger may be separated from the primary flow path with a mechanical divider, such that a pressure difference may be maintained across the heat exchanger to induce cold flow through the heat exchanger. In this case, P_source may be greater than P_sink.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. At least one example is that the labels of hot and cold side could be reversed such that features described with reference to cold side could be applied to the hot side if the intent is heating a fluid as opposed to cooling a fluid.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting any intention that the claimed embodiments require more features than are expressly recited in each claim. Rather, as the following claims reflect, the disclosed subject matter lies in less than all features of a single disclosed embodiment. Thus the following claims are hereby incorporated into the Detailed Description, with each claim standing on its own as a separately claimed subject matter.

What is claimed is:

1. A gas turbine engine, comprising:
    an engine including an engine centerline and a passage being one of a fan bypass duct, a third stream duct and a ram air duct;
    at least one contiguous heat exchanger having a cold-side inlet surface receiving a cold-side airflow; and
    at least one of:
       a ring slidably coupled to one of an inner diameter and an outer diameter of the passage, or
       a forward-facing scoop disposed within the passage;
    wherein the at least one contiguous heat exchanger is disposed within the passage such that a surface normal relative to the cold-side inlet surface is offset by at least 30 degrees from the engine centerline.

2. The engine of claim 1, wherein the at least one contiguous heat exchanger includes a pair of contiguous heat exchangers carried by a module.

3. The engine of claim 2, wherein each one of the pair of contiguous heat exchangers is spaced apart from one another.

4. The engine of claim 2, further comprising a variable flow control mechanism located within the passage.

5. The engine of claim 2, wherein each one of the pair of contiguous heat exchangers is parallel to the other and parallel to the engine centerline.

6. The engine of claim 2, wherein the pair of contiguous heat exchangers is tapered such that each one of the pair of heat exchangers has an upstream end spaced apart from the other by a first distance, and each one of the pair of heat exchangers has a downstream end spaced apart from the other by a second distance that is greater than the first distance.

7. The engine of claim 6, wherein the upstream end of each one of the heat exchangers is adjacent to the other.

8. The engine of claim 1, wherein the heat exchanger includes at least one of a plurality of guide plates disposed within the heat exchanger, a plurality of fins and a plurality of vanes disposed upstream and downstream of the heat exchanger.

9. The engine of claim 1, further comprising a module that includes an internal passage receiving the cold-side airflow from the pair of contiguous heat exchangers, and the module has a plurality of vanes disposed within the internal passage for distributing the cold-side airflow within the internal passage.

10. The engine of claim 1, further comprising a module that includes a nose cone for directing the cold-side airflow circumferentially about the engine and uniformly through the contiguous heat exchangers.

11. The engine of claim 1, further comprising a nose cone member for directing airflow within the passage.

12. The engine of claim 1, wherein the at least one contiguous heat exchanger extends circumferentially about the engine centerline and within the passage.

13. The engine of claim 1, further comprising:
a variable flow control mechanism selectively adjusting a throat area within the passage for directing the cold-side airflow through the at least one contiguous heat exchanger.

14. The engine of claim 1, wherein the passage includes a diffusing section downstream of a throat area for receiving a mixture of two air streams downstream of a divider in the passage so as to recover dynamic pressure.

15. The engine of claim 1, further comprising the ring slidably coupled to one of the inner diameter and the outer diameter of the passage, and the ring is movable between forward and aft positions.

16. The engine of claim 1, further comprising:
the forward-facing scoop disposed within the passage;
wherein the at least one contiguous heat exchanger has a forward portion coupled to the forward facing scoop and an aft portion coupled to one of the inner diameter and the outer diameter of the passage.

17. The engine of claim 1, wherein the at least one contiguous heat exchanger is pivotally attached to one of an inner diameter and an outer diameter of the passage for adjusting a throat area within the passage and adjusting the cold-side airflow through the at least one contiguous heat exchanger.

18. An engine, comprising:
an enclosure surrounding an engine having an engine centerline, and the enclosure defining a passage for a cold-side airflow;
at least one contiguous heat exchanger having a cold-side inlet surface receiving the cold-side airflow along a vector having a radial or tangential component relative to an engine centerline; and
a variable flow control mechanism for redirecting the cold-side airflow through the at least one contiguous heat exchanger;
wherein the at least one contiguous heat exchanger is disposed within the passage such that a surface normal relative to the cold-side inlet surface is offset by at least 30 degrees from the engine centerline; and
wherein the variable flow control mechanism includes a ring that is disposed aft of the contiguous heat exchanger and is movable between a forward position and an aft position.

19. The engine of claim 18, wherein one contiguous heat exchanger extends up to 360 degrees circumferentially within the engine, and the ring is configured for selectively directing air through the contiguous heat exchanger.

20. A process for cooling a heat load within an engine, comprising:
directing a cold-side airflow through a passage defined by an engine air duct; and
directing the cold-side airflow through a cold-side inlet surface of at least one contiguous heat exchanger disposed within the passage such that a surface normal relative to the cold-side inlet surface is offset by at least 30 degrees from an engine centerline;
wherein the at least one contiguous heat exchanger is pivotally attached to one of an inner diameter and an outer diameter of the passage for adjusting a throat area within the passage and adjusting the cold-side airflow through the at least one contiguous heat exchanger.

* * * * *